(12) United States Patent
Harada et al.

(10) Patent No.: US 11,252,683 B2
(45) Date of Patent: Feb. 15, 2022

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daiki Takeda, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 16/622,137

(22) PCT Filed: Jun. 15, 2017

(86) PCT No.: PCT/JP2017/022211
§ 371 (c)(1),
(2) Date: Dec. 12, 2019

(87) PCT Pub. No.: WO2018/229952
PCT Pub. Date: Dec. 20, 2018

(65) Prior Publication Data
US 2020/0128498 A1    Apr. 23, 2020

(51) Int. Cl.
*H04W 56/00* (2009.01)
*H04L 5/00* (2006.01)
*H04L 27/26* (2006.01)
*H04W 72/00* (2009.01)

(52) U.S. Cl.
CPC ........ *H04W 56/001* (2013.01); *H04L 5/0048* (2013.01); *H04L 27/2649* (2013.01); *H04W 72/005* (2013.01)

(58) Field of Classification Search
None
See application file for complete search history.

(56) References Cited

U.S. PATENT DOCUMENTS

| | | | |
|---|---|---|---|
| 11,122,497 B2* | 9/2021 | Chen | H04W 8/08 |
| 11,122,529 B2* | 9/2021 | Park | H04W 72/0466 |
| 2018/0324023 A1* | 11/2018 | Zeng | H04L 27/2656 |
| 2018/0324732 A1* | 11/2018 | Park | H04L 5/00 |
| 2018/0368054 A1* | 12/2018 | Sheng | H04L 5/0048 |
| 2019/0013917 A1* | 1/2019 | Nam | H04J 11/0086 |
| 2019/0058620 A1* | 2/2019 | Liu | H04W 48/12 |

(Continued)

OTHER PUBLICATIONS

Extended European Search Report issued in counterpart European Patent Application No. 17913446.5, dated Dec. 3, 2020 (6 pages).

(Continued)

*Primary Examiner* — Otis L Thompson, Jr.
(74) *Attorney, Agent, or Firm* — Osha Bergman Watanabe & Burton LLP

(57) ABSTRACT

SS block identification information is identified with high reliability and/or low complexity. According to one aspect of the present invention, a user terminal has a receiving section that receives a synchronization signal (SS) block, which includes a synchronization signal and a broadcast channel; and a control section that specifies identification information of the SS block, based on at least one of a difference of demodulation reference signal sequences for the broadcast channel, a difference of mapping pattern of the reference signal sequences, and a difference of frequency position to which the reference signal sequences are mapped, among a plurality of symbols in the SS block.

12 Claims, 16 Drawing Sheets

(56) References Cited

U.S. PATENT DOCUMENTS

| | | | | |
|---|---|---|---|---|
| 2019/0200306 A1* | 6/2019 | Ko | ................. | H04B 7/0617 |
| 2019/0364523 A1* | 11/2019 | Wei | ................. | H04W 48/16 |
| 2019/0387550 A1* | 12/2019 | Pan | ................. | H04L 5/0094 |
| 2020/0084704 A1* | 3/2020 | Agiwal | ................. | H04W 48/12 |
| 2020/0187159 A1* | 6/2020 | Ko | ................. | H04J 11/0069 |

OTHER PUBLICATIONS

Fujitsu; "NR-PBCH design"; 3GPP TSG RAN WG1 Meeting #89, R1-1707253; Hangzhou, China; Apr. 15-19, 2017 (10 pages).
Vivo; "Discussion on SS block time index indication"; 3GPP TSG RAN WG1 Meeting #89, R1-1707227; Hangzhou, P. R. China; May 15-19, 2017 (6 pages).

* cited by examiner

| FREQUENCY RANGE | NUMBER OF SS BLOCK INDEX BITS | IMPLICIT INDICATION | EXPLICIT INDICATION |
|---|---|---|---|
| 0–3GHz | 2 BITS (MAXIMUM 4 SS BLOCKS) | 2 BITS (ON ASSUMPTION OF 4) | – |
| 3–6GHz | 3 BITS (MAXIMUM 8 SS BLOCKS) | 3 BITS (ON ASSUMPTION OF 8) | – |
| 6–52.6GHz | 6 BITS (MAXIMUM 64 SS BLOCKS) | 3 BITS (ON ASSUMPTION OF 8) | 3 BITS |

FIG. 4

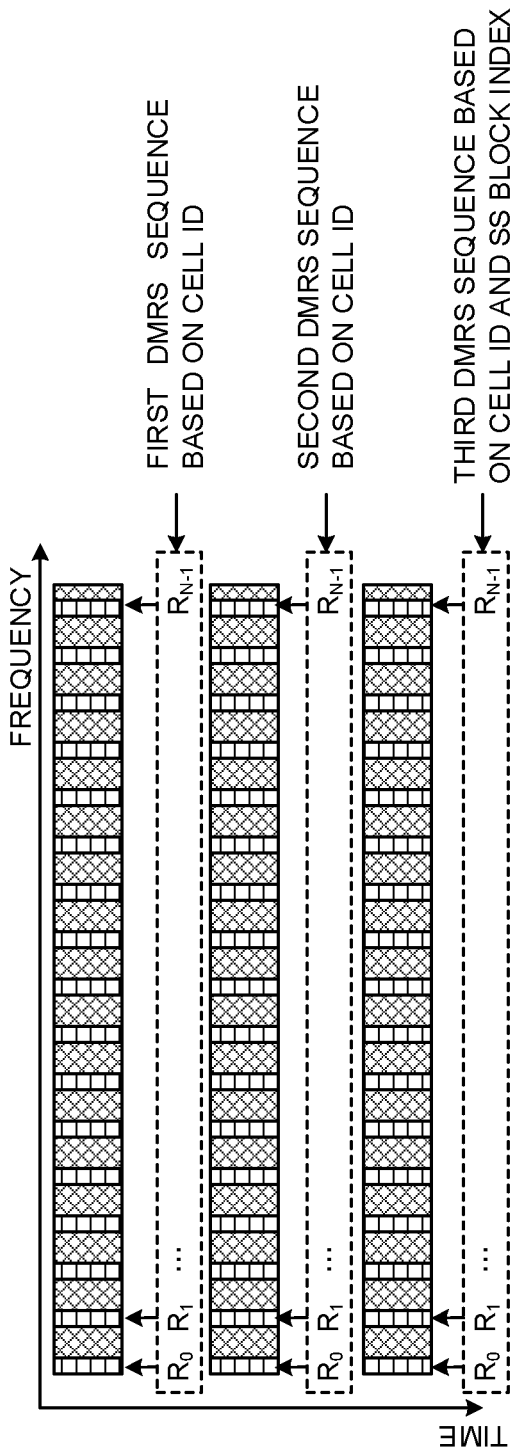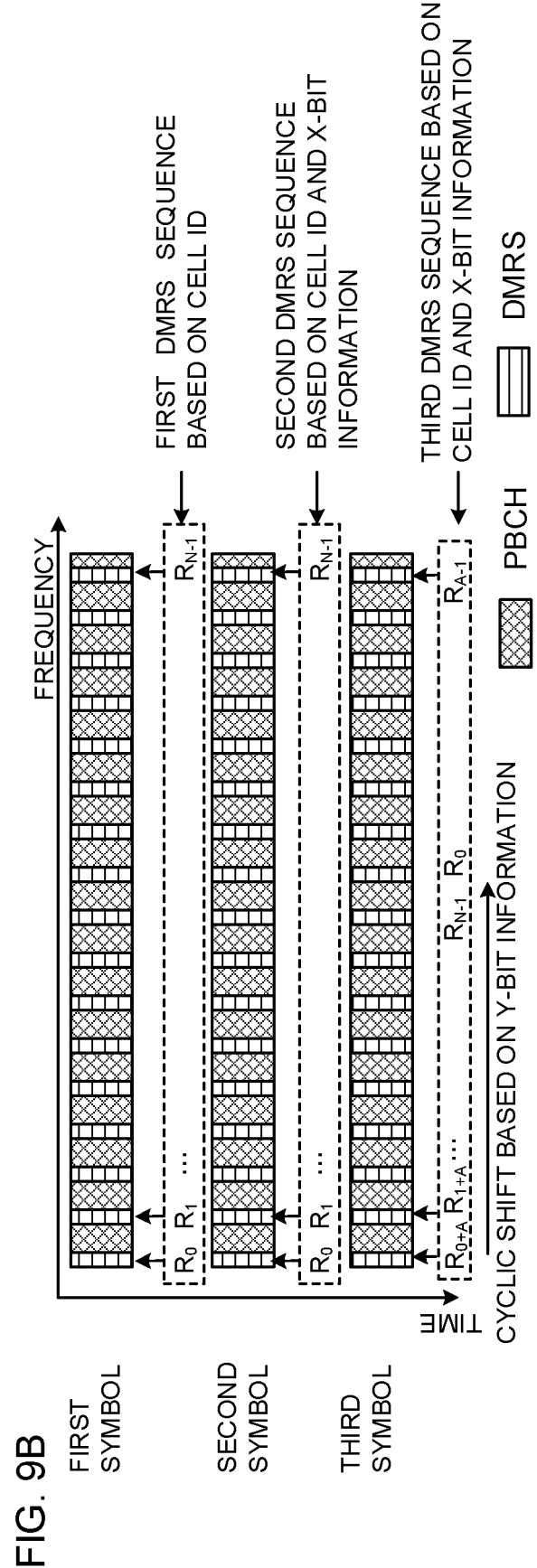

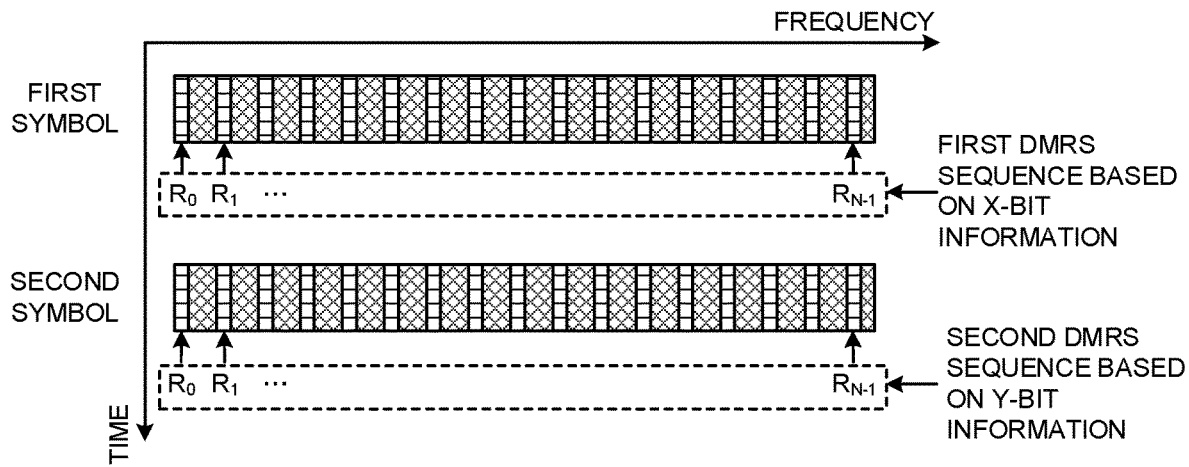
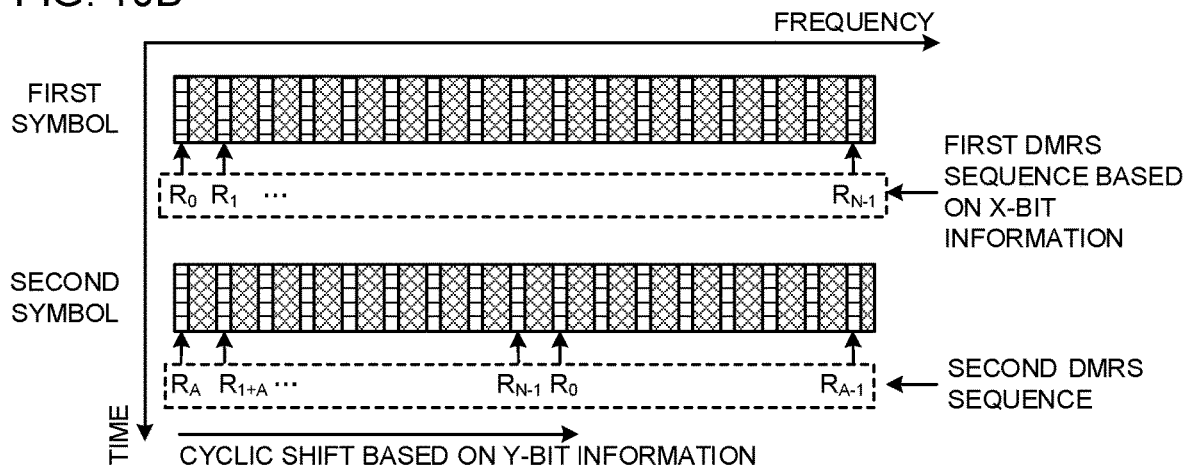
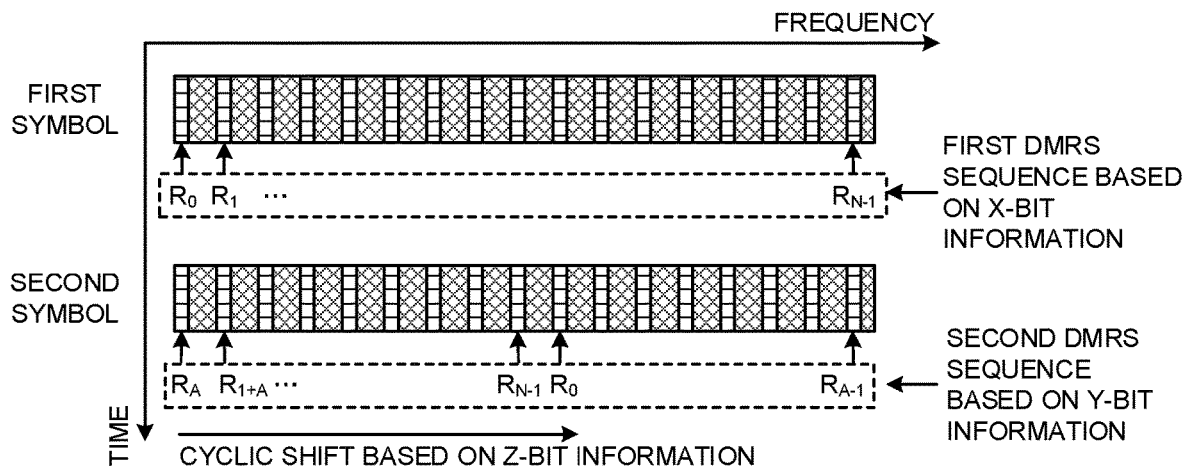

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, the specifications of LTE-A (LTE advanced and LTE Rel. 10, 11, 12 and 13) have also been drafted for the purpose of achieving increased capacity and enhancement beyond LTE (LTE Rel. 8 and 9).

Successor systems of LTE are also under study (for example, referred to as "FRA (Future Radio Access)," "5G (5th Generation mobile communication system)," "5G+ (plus)," "NR (New Radio)," "NX (New radio access)," "FX (Future generation radio access)," "LTE Rel. 14 or 15 and later versions," etc.).

In existing LTE systems (for example, LTE Rel. 8 to 13), a user terminal (UE (User Equipment)) establishes synchronization with a network (for example, a base station (eNB (eNode B))) by detecting synchronization signals (PSS (Primary Synchronization Signal) and/or SSS (Secondary Synchronization Signal)), following initial access procedures (also referred to as "cell search," for example), and, furthermore, identifies the cells to connect with (which are identified based on, for example, cell IDs (IDentifiers)).

Also, following the cell search, the user terminal receives the master information block (MIB), which is transmitted in a broadcast channel (PBCH (Physical Broadcast CHannel)), system information blocks (SIBs), which are transmitted in a downlink (DL) shared channel (PDSCH (Physical Downlink Shared CHannel)), and/or others, and acquires configuration information (which may be referred to as "broadcast information," "system information," and so forth) for communicating with the network.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Envisaging future radio communication systems (for example, NR or 5G), research is underway to define resource units including synchronization signals (also referred to as "PSS and/or SSS," "NR-PSS and/or NR-SSS," etc.) and broadcast channels (also referred to as "PBCHs," "NR-PBCHs," etc.) as a synchronization signal (SS) block, and gain initial access based on the SS block.

When gaining initial access based on an SS block, a user terminal is likely to derive the time index for identifying the timing (timing identification) based on identification information of the SS block (SS block identification information). Here, the time index may be, for example, at least one of the number of a radio frame (also referred to as a "radio frame number," a "radio frame index," etc.), the number of a slot in a radio frame (also referred to as a "slot number," a "slot index," etc.), the number of a symbol in a slot (also referred to as a "symbol number," a "symbol index," etc.), the number of a frame (also referred to as a "system frame number (SFN)" and the like) in the transmission time interval for the NR-PBCH (also referred to as a "TTI," "PBCH TTI," etc.), and a number that identifies between the first half and the second half of a radio frame.

In this way, in future radio communication systems where a time index is expected to be derived using SS block identification information, it is desirable to indicate SS block identification information to a user terminal with high reliability and/or low complexity.

The present invention has been made in view of the above, and it is therefore an object of the present invention to provide a user terminal and a radio communication method, whereby SS block identification information can be specified with high reliability and/or low complexity.

Solution to Problem

According to one aspect of the present invention, a user terminal has a receiving section that receives a synchronization signal (SS) block, which includes a synchronization signal and a broadcast channel, and a control section that specifies identification information of the SS block, based on at least one of a difference of demodulation reference signal sequences for the broadcast channel, a difference of mapping pattern of the reference signal sequences, and a difference of frequency position to which the reference signal sequences are mapped, among a plurality of symbols in the SS block.

Advantageous Effects of Invention

According to the present invention, SS block identification information can be specified with high reliability and/or low complexity.

BRIEF DESCRIPTION OF DRAWINGS

FIG. 4 is a diagram to show an example of SS block index indication;

FIGS. 9A and 9B are diagrams to show examples of SS block index indication according to a fifth example of the present invention;

FIGS. 10A to 10C are diagrams to show examples of SS block index indication according to other examples;

DESCRIPTION OF EMBODIMENTS

Future radio communication systems (including, for example, LTE Rel. 14, 15 or later versions, 5G, NR, etc., and hereinafter also referred to as "NR") are under study so that a resource unit to include at least a synchronization signal and a broadcast channel is defined as a synchronization signal (SS) block, and communication is carried out (for example, initial access is gained) using this SS block.

An SS block may include, for example, at least a primary synchronization signal (also referred to as "PSS," "NR-PSS," "first synchronization signal," "first synchronization channel," etc.) and/or a secondary synchronization signal (also referred to as "SSS," "NR-SSS," "second synchronization signal," "second synchronization channel," etc.), and broadcast channels (also referred to as "PBCHs (Physical Broadcast CHannels)," "NR-PBCHs," "broadcast signals," "master information blocks (MIBs)," "system information," etc.) Note that synchronization signals other than PSS and SSS (for example, a TSS (Tertiary SS)) may be included in an SS block. Hereinafter, NR-PSS and/or NR-SSS will be also referred to as "NR-PSS/SSS."

Also, an SS block is comprised of one or more symbols (for example, OFDM symbols). To be more specific, an SS block may be comprised of a number of contiguous symbols. In this SS block, an NR-PSS, an NR-SSS and NR-PBCHs may be each allocated in one or more different symbols. For example, regarding SS blocks, a study is in progress to form an SS block with four symbols, including one NR-PSS symbol, one NR-SSS symbol and two NR-PBCH symbols.

FIG. 1 are diagrams to show examples of SS block formats. Note that, although FIGS. 1A to 1D each illustrate an SS block comprised of four symbols, the SS block formats shown in FIGS. 1A to 1D are by no means limiting. For example, NR-PBCHs may be allocated to three or more symbols, and an SS block may be comprised of five or more symbols.

As shown in FIGS. 1A to 1D, as for the order of allocating an NR-PSS (PSS), an NR-SSS (SSS) and NR-PBCHs (PBCHs) in an SS block, the order of an NR-PSS, an NR-SSS, an NR-PBCH and an NR-PBCH (see FIG. 1A), the order of an NR-PSS, an NR-PBCH, an NR-SSS and an NR-PBCH (FIG. 1B), the order of an NR-PBCH, an NR-PSS, an NR-SSS and an NR-PBCH (FIG. 1C), or the order of an NR-PSS, an NR-PBCH, an NR-PBCH and an NR-SSS (FIG. 1D) may be used.

Figure 1A:
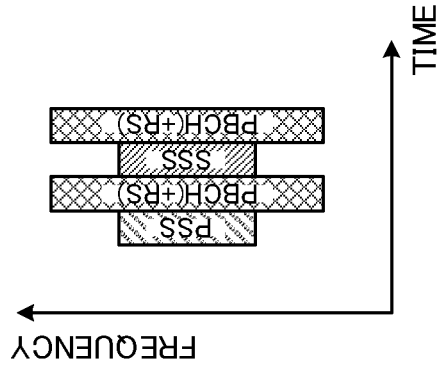
FIGS. 1A to 1D are diagrams to show examples of SS block formats.
Figure 1B:
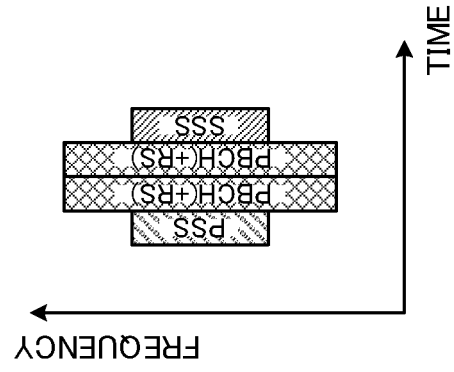
Figure 1C:
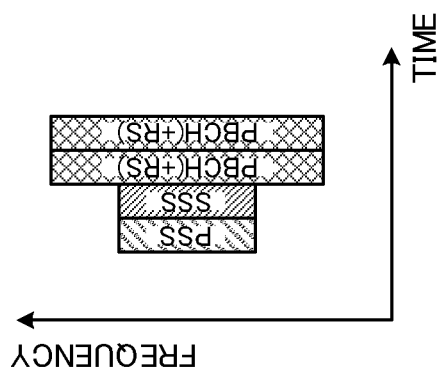
Figure 1D:
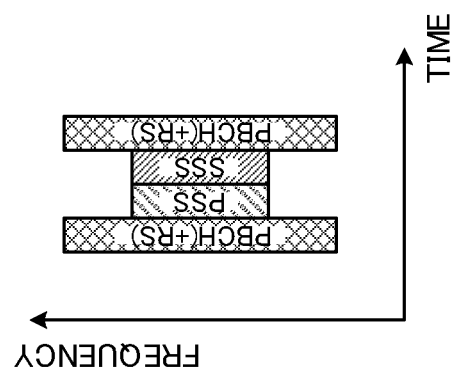

NR-PBCHs may be allocated to two contiguous symbols following an NR-PSS and an NR-SSS (FIG. 1A), or may be allocated to two contiguous symbols between an NR-PSS and an NR-SSS (FIG. 1D). Alternatively, NR-PBCHs may be distributed and allocated to one symbol after an NR-PSS and one symbol after an NR-SSS (FIG. 1B), or may be distributed and allocated to one symbol before an NR-PSS and one symbol after an NR-SSS (FIG. 1C).

As shown in FIGS. 1A to 1D, an NR-PSS/SSS and NR-PBCHs may be allocated (mapped) to frequency fields (or frequency bands) of different bandwidths (different numbers of resource blocks). For example, an NR-PSS/SSS may be mapped to a first frequency field (which is comprised of, for example, 127 sequences (or 127 subcarriers)), and NR-PBCHs may be mapped to a second frequency field (which is comprised of, for example, 288 subcarriers), which is wider than the first frequency field.

In this case, the NR-PSS/SSS may be each mapped to 127 subcarriers×one symbol, and the NR-PBCHs may be mapped to 288 subcarriers×two symbols. Also, the reference signals for use for demodulating the NR-PBCHs (also referred to as "demodulation reference signals," "DMRSs," etc.) may be mapped to the second frequency field. Note that the frequency fields (for example, the number of subcarriers) to constitute the NR-PSS/SSS and the NR-PBCHs are by no means limited to the above-noted values.

Also, the first frequency field for mapping the NR-PSS/SSS and the second frequency field for mapping the NR-PBCHs may be allocated to overlap each other, at least partially. For example, the NR-PSS, the NR-SSS and the NR-PBCHs may be allocated so that their center frequencies coincide. This can reduce the frequency fields where a UE has to perform SS block receiving processes when gaining initial access (also referred to as "cell search," and the like), and so on.

Figure 2A:
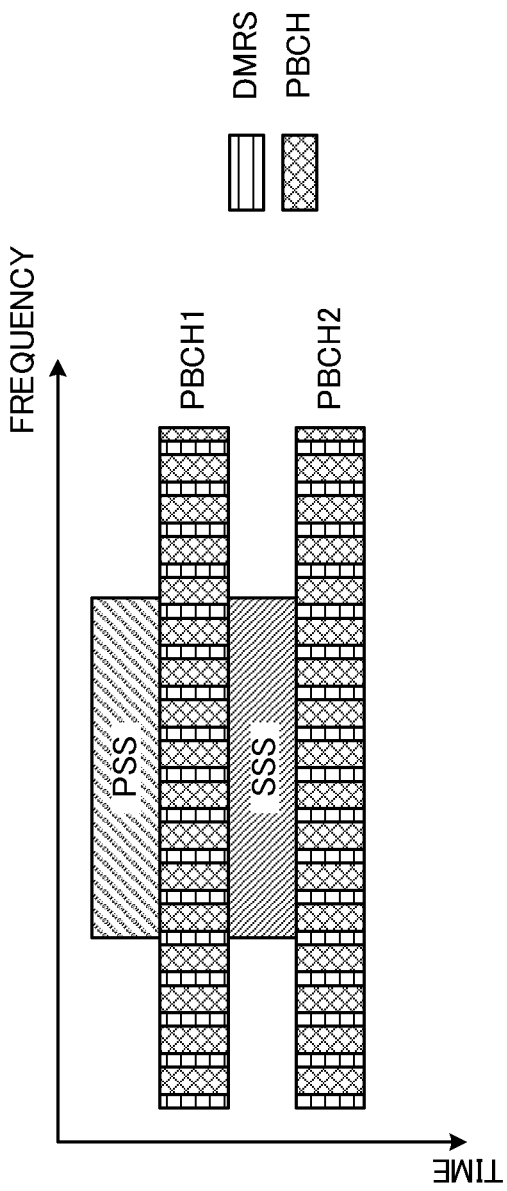
FIGS. 2A and 2B are diagrams to show examples of multiplexing of DMRSs over NR-PBCHs.
Figure 2B:
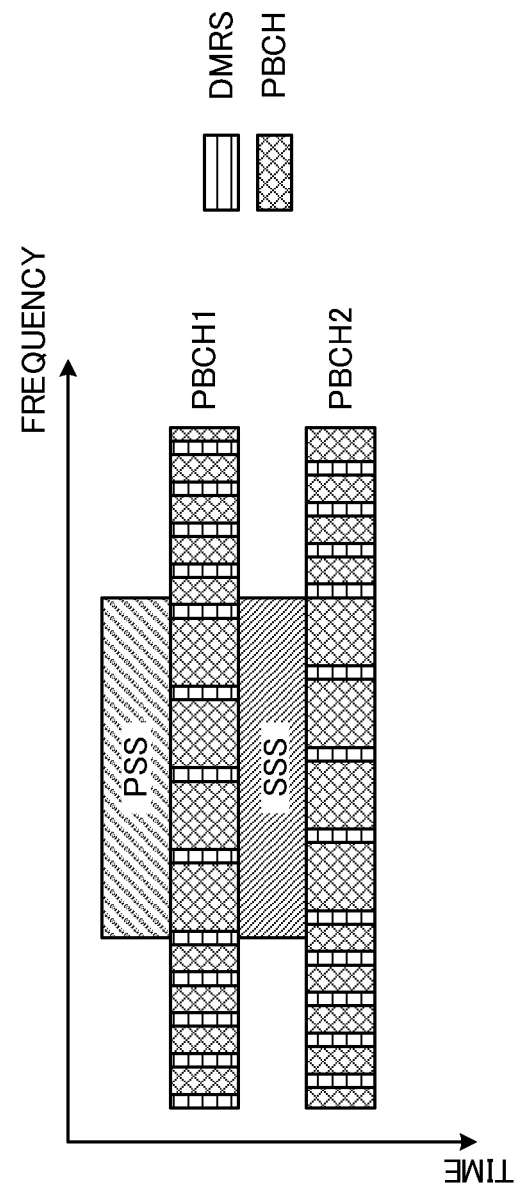

FIG. 2 are diagrams to show examples of multiplexing of DMRSs with NR-PBCHs. Note that, although, in FIGS. 2A and 2B, the configuration shown in FIG. 1B is applied to the SS blocks, other configurations (for example, the configuration shown in FIG. 1A, 1C or 1D) may be applied as well.

Referring to FIG. 2A, in symbols in the SS block where NR-PBCHs are allocated, DMRS sequences are mapped to frequency positions (for example, subcarriers) at regular intervals. For example, the ratio of mapping of DMRS sequences and NR-PBCHs in one symbol may be 1:3 (for example, a DMRS may be mapped every four subcarriers).

On the other hand, referring to FIG. 2B, in symbols where NR-PBCHs are allocated, DMRS sequences are allocated to subcarriers at non-regular intervals. For example, in FIG. 2B, in the transmission band for the NR-PSS/SSS, DMRS sequences may be allocated at a lower density than outside this transmission band, or may not be allocated at all. For example, referring to FIG. 2B, in one symbol, DMRS sequences and NR-PBCHs may be mapped at a ratio of 1:3 outside the transmission band for the NR-PSS/SSS, but may be mapped at a ratio of 1:6 inside this transmission band.

Note that, in FIGS. 2A and 2B, DMRS sequences may be mapped at the same density and to the same frequency positions, among a number of symbols (here, between two symbols) for NR-PBCHs in an SS block, but may be mapped at different densities and/or to different frequency positions. For example, DMRS sequences may not be mapped to specific symbols in the transmission band for the NR-PSS/SSS, and, in other symbols, DMRS sequences may be allocated at a lower density than outside this transmission band, or may be allocated at the same density. Also, DMRS sequences may be mapped to different frequency positions among a number of symbols (for example, frequency shifting may be applied).

A set of one or more SS blocks formed as described above may be referred to as an "SS burst." An SS burst may be comprised of SS blocks of contiguous frequency and/or time resources, or may be comprised of SS blocks of non-contiguous frequency and/or time resources. It is preferable that SS bursts are transmitted in a predetermined cycle (which may be referred to as an "SS burst cycle"). Alternatively, SS bursts may not be transmitted periodically (that is, may be transmitted aperiodically).

Also, one or more SS bursts may be referred to as an "SS burst set (SS burst series)." For example, a radio base station (also referred to as a "BS (Base Station)," a "transmission/reception point (TRP)," an "eNB (eNode B)," a "gNB (gNode B)," etc.) and/or a user terminal may transmit an NR-PSS, an NR-SSS and NR-PBCHs (also referred to as "NR-PSS/SSS/PBCHs" or the like) by executing beam sweeping using one or more SS bursts included in one SS burst set. Note that SS burst sets are transmitted periodically. The UE may control receiving processes on the assumption that SS burst sets are transmitted periodically (in the SS burst set cycle).

Figure 3A:
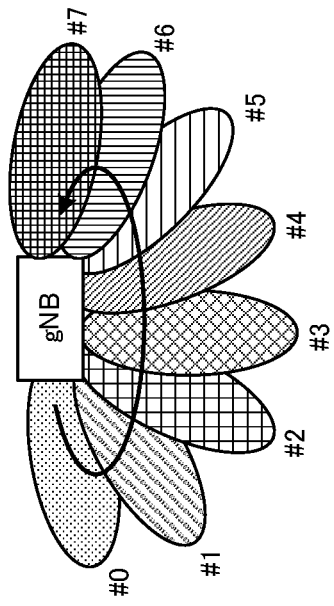
FIGS. 3A and 3B are diagrams to show examples of SS burst sets.
Figure 3B:
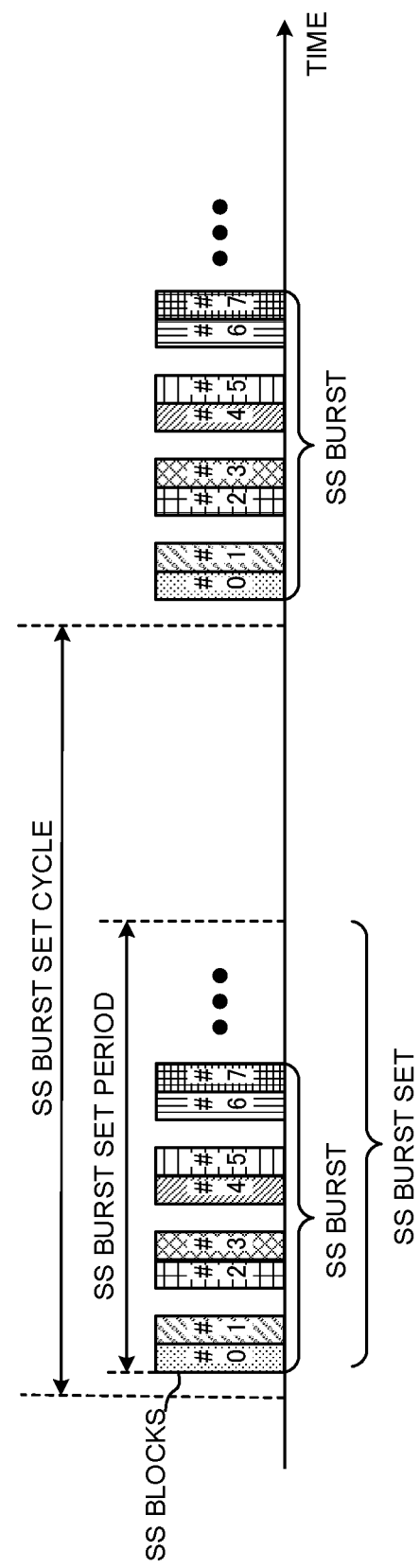

FIG. 3 are diagrams to show examples of SS burst sets. FIG. 3A shows an example of beam sweeping. Referring to FIGS. 3A and 3B, a radio base station (gNB) may transmit different SS blocks, using different beams, by changing the directivity of beams over time (beam sweeping). Note that, although FIGS. 3A and 3B show examples using multiple beams, it is also possible to transmit SS blocks using a single beam.

Referring to FIG. 3B, an SS burst is comprised of one or more SS blocks, and an SS burst set is comprised of one or more SS bursts. For example, FIG. 3B assumes that the SS burst is comprised of eight SS blocks #0 to #7, but this is by no means limiting. SS blocks #0 to #7 may be transmitted using different beams #0 to #7 (FIG. 3A), respectively.

Referring to FIG. 3B, the SS burst set including SS blocks #0 to #7 may be transmitted so as not to exceed a predetermined period (which is, for example, 5 ms or less, and which is also referred to as an "SS burst set period" and the like). Also, the SS burst set may be repeated in a predetermined cycle (which is, for example, 5, 10, 20, 40, 80 or 160 ms, and which is also referred to as "SS burst set cycle," and the like).

In addition, in FIG. 3B, there are predetermined time gaps between SS blocks #1 and #2, between SS blocks #3 and #4, and between SS blocks #5 and #6, these time gaps do not have to be provided, or may be provided between other SS blocks (for example, between SS blocks #2 and #3, between SS blocks #5 and #6, and so forth). For example, in this time gap, a DL control channel (PDCCH (Physical Downlink Control CHannel), NR-PDCCH, or DCI (Downlink Control Information), etc.) may be transmitted, and/or a UL control channel (PUCCH (Physical Uplink Control CHannel)) may be transmitted from the user terminal For example, given that each SS block is comprised of four symbols, two NR-PDCCH symbols, two SS blocks, two NR-PUCCH symbols and a guard time may be included in a slot of fourteen symbols.

FIGS. 3A and 3B assume that the user terminal derives the time index for timing identification based on identification information of an SS block that is transmitted in one beam (SS block identification information). As mentioned earlier, this time index may be, for example, at least one of a radio frame number, a slot number, a symbol number, an SFN in the TTI for an NR-PBCH and a number that identifies between the first half and the second half of a radio frame.

Here, the SS block identification information may be indices (SS block indices) that uniquely identify SS blocks in an SS burst set. In this case, the user terminal may derive the time index based on these SS block indices.

Alternatively, SS block identification information may be a combination of SS block indices that uniquely identify SS blocks in an SS burst and indices that uniquely identify SS bursts in an SS burst set (SS burst indices). In this case, the user terminal may derive the time index based on these SS block indices and SS burst indices. Note that a common SS burst index applies to SS blocks in the same SS burst.

This SS block identification information is mutually associated with NR-PSS/SSS/PBCHs. For example, the user terminal may assume that NR-PSS/SSS/PBCHs that correspond to the same SS block index are transmitted at the same antenna port (for example, by using the same beam, by applying the same precoding, and so forth). Also, an SS block index may be associated with at least one of NR-PSS/SSS/PBCH sequences, their mapping positions (time and/or frequency resources) and so forth.

Also, as for the method of indicating SS block identification information, for example, (1) explicit indication using the NR-PBCH, (2) implicit indication using the NR-PBCH, (3) implicit indication using the DMRS for the NR-PBCH, or a combination of one or more of these may be possible. Now, example cases will be described below, in which SS block indices are indicated as SS block identification information.

(1) In the event an explicit indication is sent using the NR-PBCH, SS block indices are included in the payload of the NR-PBCH. Meanwhile, given that up to 64 SS blocks (for example, 6 to 52.6 GHz) are included in an SS burst set, the SS block indices may increase the NR-PBCH payload by up to six bits.

In this way, when an explicit indication is sent using the payload of the NR-PBCH, the performance of the NR-PBCHs might decline if the number of SS block indices to indicate increases. In addition, given the risk that sufficient reliability cannot be achieved only by decoding the PBCHs in one SS block (one-shot PBCH decoding), when attempting to receive an SS block of the same index number a number of times, there is a risk that acquiring of the time index may be delayed.

(2) In the event an implicit indication is sent using the NR-PBCH, SS block indices are associated with parameters that relate to the NR-PBCH (for example, at least one of redundancy versions (RVs), the cyclic shifts of polar codewords, and the relationship between the phases of two NR-PBCH symbols, and so forth). The user terminal detects SS block indices based on these parameters. With this method, when the number of SS block indices to indicate increases, processes related to, for example, designing signals and identifying signal sequences become complex, and the burden of communication might increase.

(3) In the event an implicit indication is sent using the DMRS for the NR-PBCH, SS block indices are associated with parameters related to the DMRS (for example, at least one of the sequence and the phase rotation). The user terminal detects SS block indices based on these parameters. This method can achieve improved performance compared to the above-noted explicit indication. Meanwhile, when the number of SS block indices to indicate increases, the complexity of blind decoding and/or the error detection rate in the user terminal might increase.

As mentioned earlier, assuming that the number of SS block indices to indicate increases, if the explicit indication of (1) is used, there is a risk that the performance of the NR-PBCHs might decline due to the increase in the number of NR-PBCH bits, and, if the implicit indication of (2) or (3) is used, processes such as blind decoding may become complex. Therefore, combining an explicit indication and an implicit indication is under study as (4).

FIG. 4 is a diagram to show an example of SS block index indication. The maximum number of SS blocks in an SS burst set is likely to vary per frequency range (also referred to as "frequency band," "frequency bandwidth," etc.). For example, an SS burst set in a first frequency range (for example, 0 to 3 GHz) may be comprised of maximum four SS blocks, an SS burst set in a second frequency range (for example, 3 to 6 GHz) may be comprised of maximum eight SS blocks, and an SS burst set in a third frequency range (for example, 6 to 52.6 GHz) may be comprised of maximum 64 SS blocks.

In this way, when the maximum number of SS blocks in an SS burst set varies per frequency range, SS block indices may be indicated using a method that is suitable for each frequency range (or each maximum number). For example, referring to FIG. 4, when the frequency range is smaller than 6 GHz, SS block indices may be indicated implicitly using the DMRS for the NR-PBCH. Meanwhile, in FIG. 4, if the frequency range is 6 to 52.6 GHz, three bits of SS block indices may be indicated implicitly using the DMRS for the NR-PBCH, and the remaining three bits may be indicated explicitly using the NR-PBCH payload.

As mentioned earlier, although various methods for indicating SS block identification information are presently under research, it is preferable to indicate SS block identification information to user terminals in a more reliable (reliability) and/or less complex (complexity) manner.

So, the present inventors have focused on the fact that an SS block includes multiple symbols for NR-PBCHs, and come up with the idea of identifying SS block identification information based on at least one of a difference of DMRS sequences for NR-PBCHs, a difference of mapping patterns of these DMRS sequences, and a difference of frequency positions where these DMRS sequences are mapped, among these multiple symbols. Also, the present inventors have come up with the idea of deriving at least one of DMRS sequences, mapping patterns and frequency positions for different NR-PBCH symbols based on different pieces of information.

Now, embodiments of the present invention will be described below in detail with reference to the accompanying drawings. In the following description, any configuration exemplified in FIGS. 1A to 1D may be applied to the SS block, and a configuration not shown (for example, a five-symbol configuration) may be applied. In the following description, only a number of symbols for NR-PBCHs in an SS block will be illustrated, but, obviously, symbols for NR-PSS/SSS are also included in the SS block.

Also, in the following description, cases will be exemplified where DMRSs are mapped to frequency positions (for example, one or more subcarriers) at equal intervals in each NR-PBCH symbol, but, as mentioned earlier, the frequency positions and/or the density for mapping DMRS sequences are not limited to those illustrated below.

Also, although, in the following description, cases will be exemplified where SS block indices are indicated as SS block identification information, when SS block indices and SS burst indices are indicated as SS block identification information, "SS block indices" in the following description can be replaced with "SS block indices and SS burst indices."

First Example

According to a first example of the present invention, SS block indices are represented by differences among a number of symbols for NR-PBCHs in an SS block in DMRS sequences (or their sequence patterns).

Figure 5:
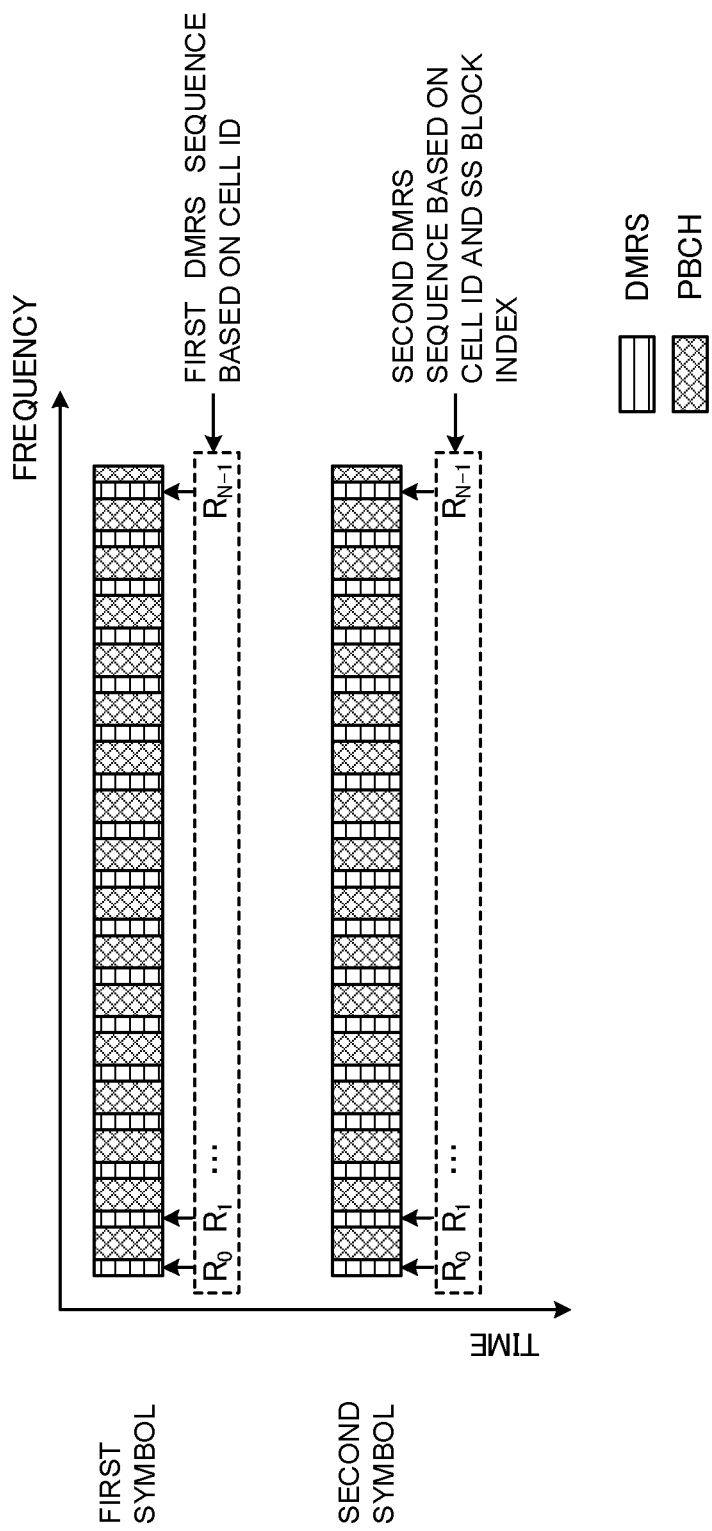
FIG. 5 is a diagram to show an example of SS block index indication according to a first example of the present invention.

FIG. 5 is a diagram to show an example of SS block index indication according to the first example of the present invention. As shown in FIG. 5, a radio base station may generate the first DMRS sequence in the first symbol for the NR-PBCH, based at least on a cell ID (PCI (Physical Cell ID)), information that identifies a cell (also referred to as "cell identification information," etc.). A user terminal specifies the cell ID by detecting an NR-PSS/SSS in initial access procedures. The user terminal may uniquely identify the first DMRS sequence based on this cell ID.

Also, the radio base station may determine the first DMRS sequence based on a cell ID and a time index (for example, at least one of a radio frame number, a slot number, a symbol number, an SFN in the TTI for the NR-PBCH, and a number that identifies between the first half and the second half of a radio frame).

As mentioned earlier, the time index is derived based on SS block indices, at the point the user terminal determines the first DMRS sequence, the user terminal may not be able to specify the time index. Therefore, when the first DMRS sequence is based on the cell ID and the time index, the user terminal may specify the first DMRS sequence based on the cell ID specified by detecting the NR-PSS/SSS and based on blind detection using each candidate time index.

On the other hand, the radio base station may generate a second DMRS sequence for a second symbol for the NR-PBCH based at least on a cell ID and an SS block index. The cell ID is associated with one or more candidate SS block indices in advance. The user terminal may specify the second DMRS sequence by performing blind detection using each candidate SS block index associated with the cell ID.

Note that the maximum number of SS blocks in an SS burst set is determined in advance per frequency range (see FIG. 4). Therefore, a cell ID may be associated with one or more candidate SS block indices per frequency range.

In this case, the user terminal may specify the second DMRS sequence by performing blind detection using candidate SS block indices that are defined per frequency range.

In FIG. 5, the user terminal may identify the SS block index based on the difference between the first DMRS sequence and the second DMRS sequence specified as described above. Note that, in FIG. 5, the second DMRS is generated based on SS block indices, but this is by no means limiting. The DMRS sequences of part of the NR-PBCH symbols in the SS slot may be based on the SS block indices.

Now, a cell-specific reference signal sequence (CRS sequence) for use for channel estimation for the PBCH in existing LTE systems (for example, LTE Rel.13 or earlier versions) is generated based on following equation 1:

$$r_{l,n_s}(m) = \frac{1}{\sqrt{2}}(1 - 2 \cdot c(2m)) + j\frac{1}{\sqrt{2}}(1 - 2 \cdot c(2m + 1)), \quad \text{(Equation 1)}$$

$$m = 0, 1, \ldots, 2N_{RB}^{max,DL} - 1$$

Here, $n_S$ is a slot number in a radio frame, and l is a symbol number in a slot. The pseudo-random sequence c(n) that is used to generate the CRS sequence is represented by length 31 Gold sequence, as shown in following equation 2:

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{(Equation 2)}$$

The above pseudo-random sequence is initialized at the beginning of each symbol by using a parameter $C_{init}$ defined by following equation 3:

$$c_{init} = 2^{10}(7 \cdot (n'_s + 1) + l + 1) \cdot (2 \cdot N_{ID}^{cell} + 1) + 2 \cdot N_{ID}^{cell} + N_{CP} \quad \text{(Equation 3)}$$

Here, $n'_S = n_S$, $N^{cell}_{ID}$ is the cell ID, and $N_{CP}$ is the cyclic prefix (CP) length.

The first DMRS sequence and the second DMRS sequence for the above NR-PBCH may be generated using pseudo-random sequences, the same as when CRS sequences are generated as shown by equation 1 above.

For example, the pseudo-random sequence to use to generate the first DMRS sequence may be initialized using parameters based on the cell ID ($N^{cell}_{ID}$). Also, the pseudo-random sequence may be initialized using a parameter (for example, $C_{init}$ above) that is based on the cell ID and the time index (for example, at least one of a slot number ($n'_S$), a symbol number (l), and the cyclic prefix (CP) length). This parameter may be provided by, for example, modifying above equation 3 for the first DMRS sequence.

Meanwhile, the pseudo-random sequence to use to generate the second DMRS sequence may be initialized using parameters based on the cell ID ($N^{Cell}_{ID}$) and the SS block index. Also, the pseudo-random sequence may be initialized using parameters based on the cell ID, the SS block index and the above time index. The parameter may be provided by, for example, modifying equation 3 so as to take into consideration the SS block index.

As described above, according to the first example, differences in DMRS sequences among a number of symbols for NR-PBCHs in an SS block represent SS block indices, so that the user terminal can specify SS block indices with high reliability and/or low complexity.

Second Example

According to a second example of the present invention, differences among a number of symbols in an SS block in the mapping pattern (for example, cyclic shift size) of NR-PBCH DMRS sequences to radio resources (for example, resource elements (REs) or subcarriers) represent SS block indices.

Figure 6:
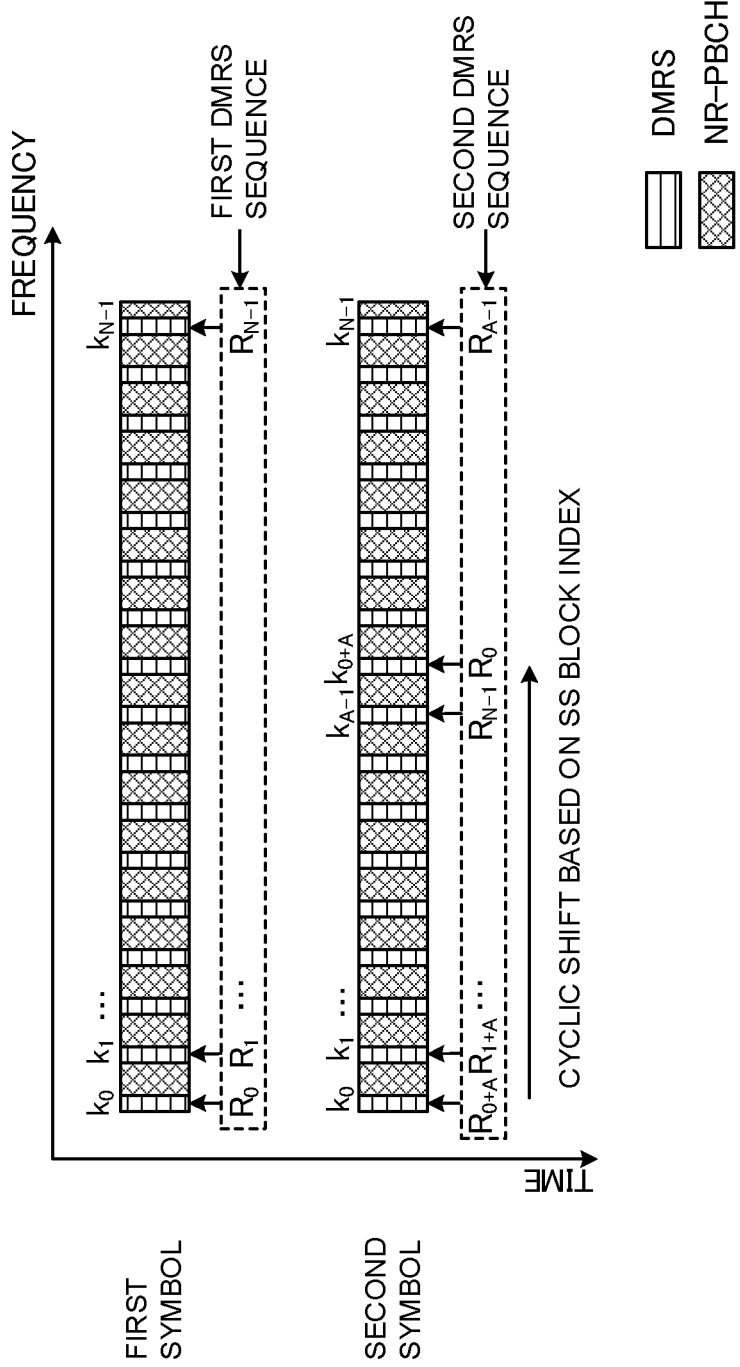
FIG. 6 is a diagram to show an example of SS block index indication according to a second example of the present invention.

FIG. 6 is a diagram to show an example of SS block index indication according to the second example of the present invention. As shown in FIG. 6, the radio base station may map the first DMRS sequence in the first symbol for the NR-PBCH to REs, according to a predetermined mapping pattern. The predetermined mapping pattern may be determined in advance in the specification, or may be determined based on the time index described above.

Meanwhile, the radio base station shifts the mapping pattern for the second DMRS sequence of the second symbol for the NR-PBCH from the mapping pattern for the first DMRS sequence. The radio base station maps the second DMRS sequence to REs based on the shifted mapping pattern. Here, the cyclic shift size for the mapping patterns may be determined based on SS block indices.

For example, cyclic shift size A may be determined based on following equation 4:

$$A = (\text{SS block index}) * a \quad \text{(Equation 4)}$$

Here, the SS block index assumes a different value per frequency range, and, in the event of 3 to 6 GHz, for example, the SS block index may have up to eight types of values [0, 1, . . . , 7]. Also, a is a predetermined parameter, and may be determined in advance in the specification and/or by higher layer signaling. Also, the predetermined parameter may be based on the cell ID and/or the time index. Note that equation 4 is only an example, and the cyclic shift size A may be determined based on a number of parameters other than a.

For example, in the case of FIG. 6, first DMRS sequences $R_0 \ldots R_{N-1}$ of length N are mapped to N subcarriers $k_0 \ldots k_{N-1}$, provided in the band where NR-PBCHs are allocated, on an as-is basis. Meanwhile, second DMRS sequences $R_0 \ldots R_{N-1}$ of length N are cyclic-shifted by size A, so that second DMRS sequences $R_{0+A}$, $R_{1+A}$ . . . $R_{N-1}$, . . . , $R_0$ and $R_{A-1}$ are mapped to $k_0$, $k_1$ . . . $k_{A-1}$, $k_{0+A}$ . . . and $k_{N-1}$.

The user terminal may detect the cyclic shift size by performing blind detection using each candidate SS block index, and specify the SS block index. Note that, in FIG. 6, the mapping pattern for the second DMRS sequence is shifted, but this is by no means limiting. The mapping pattern for DMRS sequences in part of the NR-PBCH symbols in the SS slot may be shifted.

Also, in the second example, the radio base station may generate the first DMRS sequence and the second DMRS sequence using the same method. For example, the radio base station may generate the first DMRS sequence and the second DMRS sequence based on the cell ID (or the cell ID and the time index).

According to the second example, differences among a number of symbols for NR-PBCHs in an SS block in the mapping pattern of DMRS sequences represent SS block indices, so that a user terminal can specify SS block indices with high reliability and/or low complexity.

Third Example

According to a third example of the present invention, differences among a number of symbols for NR-PBCHs in an SS block in the frequency positions (mapping positions) for mapping DMRS sequences represent SS block indices.

Figure 7:
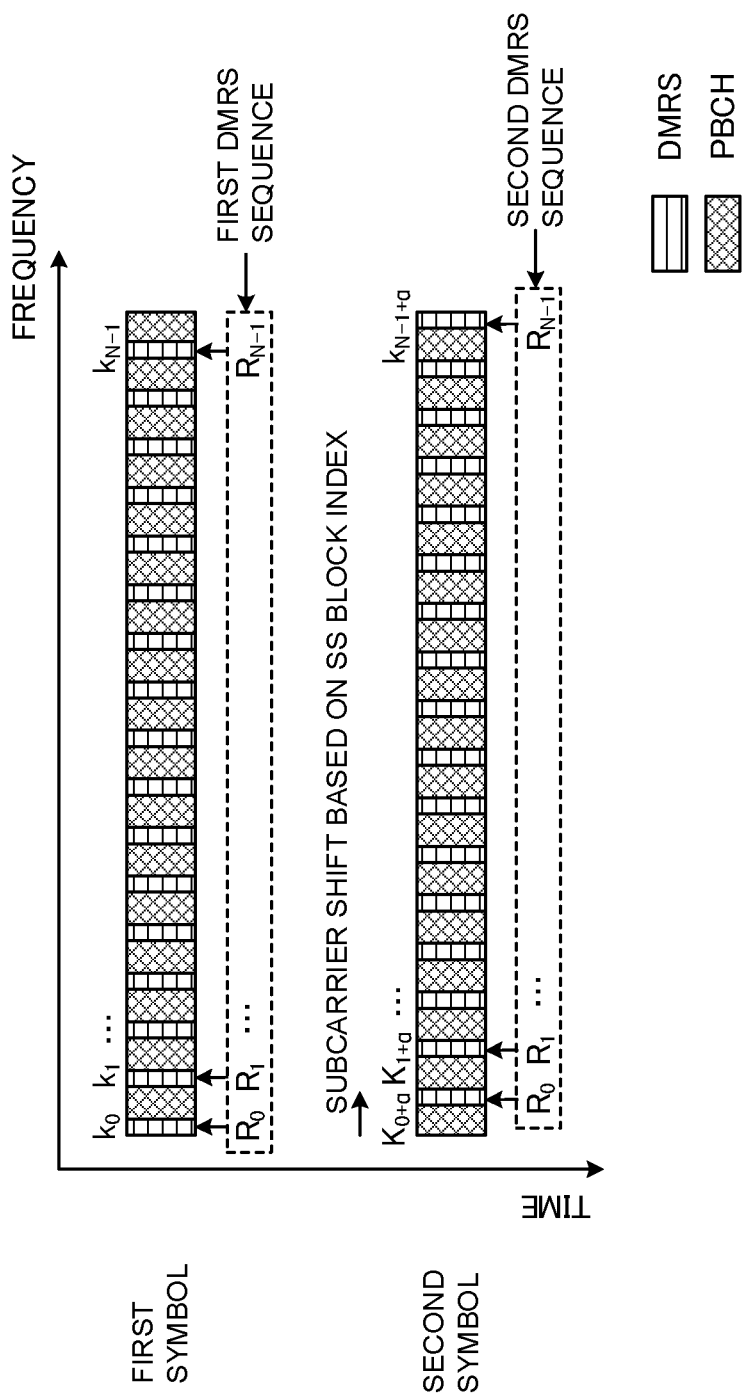
FIG. 7 is a diagram to show an example of SS block index indication according to a third example of the present invention.

FIG. 7 is a diagram to show an example of SS block index indication according to the third example of the present invention. As shown in FIG. 7, the radio base station may map first DMRS sequences for the first symbol for the NR-PBCH to predetermined frequency positions. The predetermined frequency position may be determined in advance in the specification, or may be determined based on the cell ID and/or the time index.

Meanwhile, the radio base station shifts the mapping positions of second DMRS sequences of the second symbol for the NR-PBCH from the mapping positions of first DMRS sequences. The radio base station maps the second DMRS sequences to the shifted frequency positions.

For example, in the case of FIG. 7, first DMRS sequences $R_0 \ldots R_{N-1}$ of length N are mapped to N subcarriers $k_0 \ldots k_{N-1}$, provided in the band where NR-PBCHs are allocated. Meanwhile, the subcarriers where second DMRS sequences $R_0 \ldots R_{N-1}$ of length N are mapped are shifted by size α, so that second DMRS sequences $R_0 \ldots R_{N-1}$ are mapped to $k_{0+\alpha} \ldots k_{N-1+\alpha}$.

Here, the shift size α for the frequency positions may be determined based on SS block indices. Also, the shift size α may be determined based on the SS block index and a predetermined parameter (for example, at least one of a parameter configured in advance in the specification or configured by higher layer signaling, a parameter based on the cell ID, and a parameter based on the time index).

The user terminal may detect the shift size α by performing blind detection using each candidate SS block index, and specify the SS block index. Note that, in FIG. 7, the frequency positions (mapping positions) for the second DMRS sequence are shifted, but this is by no means limiting. The mapping positions for DMRS sequences in part of the NR-PBCH symbols in an SS slot may be shifted.

Also, in the third example, the radio base station may generate the first DMRS sequence and the second DMRS sequence using the same method. For example, the radio base station may generate the first DMRS sequence and the second DMRS sequence based on the cell ID (or the cell ID and the time index).

According to the third example, differences among a number of symbols for NR-PBCHs in an SS block in the mapping positions of DMRS sequences represent SS block indices, so that a user terminal can specify SS block indices with high reliability and/or low complexity.

Fourth Example

A fourth example of the present invention will describe below at least two combinations of the first to third examples. To be more specific, with the fourth example, all of the SS block index bits may be divided into a plurality of parts, and the bit values may be indicated using different methods per part.

Figure 8A:
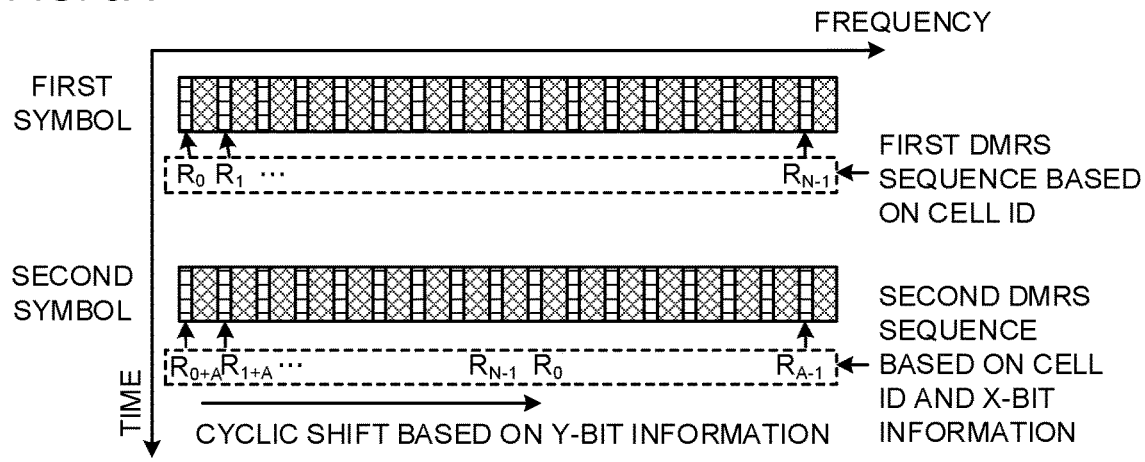
FIGS. 8A to 8C are diagrams to show examples of SS block index indication according to a fourth example of the present invention.
Figure 8B:
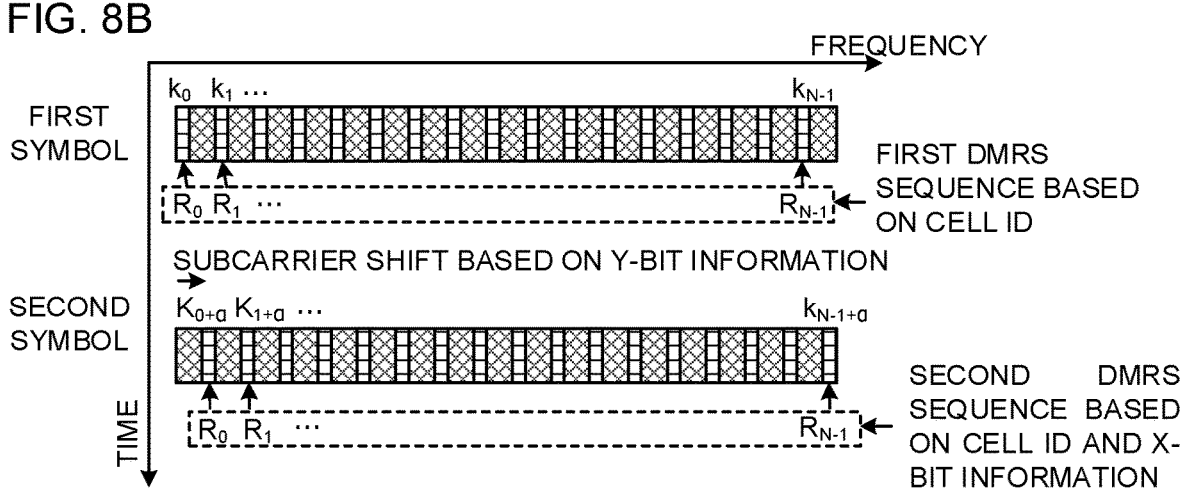
Figure 8C:
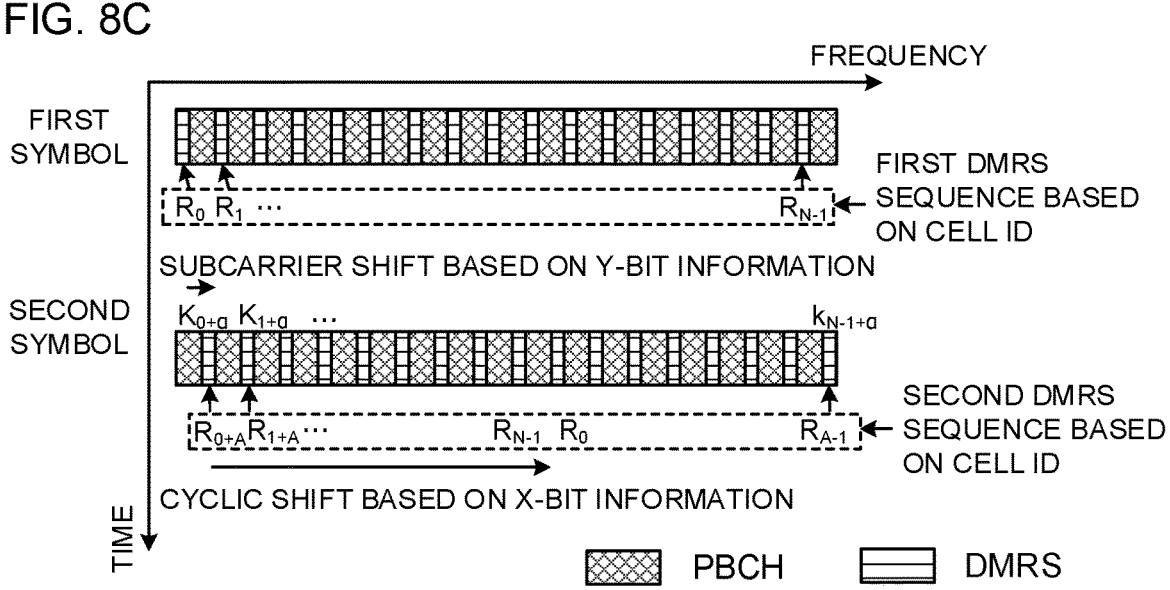

FIG. 8 are diagrams to show examples of SS block index indication according to the fourth example of the present invention. Note that, in FIGS. 8A to 8C, all bits of SS block indices are divided into two parts (X bits and Y bits), but may be divided into three or more parts. Note that the total number of SS block index bits may vary per frequency range, and may be, for example, two bits, three bits or six bits, as shown in FIG. 4.

FIG. 8A shows an example of combining the first example and the second example, to indicate SS block indices. As shown in FIG. 8A, the bit value of X bits (X-bit information) constituting the SS block index may be represented by differences between the sequence patterns for first DMRS sequence and the second DMRS sequence, and the bit value of Y bits (Y-bit information) constituting the SS block index may be represented by differences between the mapping patterns (for example, cyclic shifts) of the first DMRS sequence and the second DMRS sequence.

For example, as shown in FIG. 8A, the first DMRS sequence may be generated based on the cell ID, and the second DMRS sequence may be generated based on the cell ID and the X-bit information. Also, the mapping pattern for the second DMRS sequence may be cyclic-shifted from the mapping pattern for the first DMRS sequence by a size A, which is based on the Y-bit information.

FIG. 8B shows an example of combining the first example and the third example, to indicate SS block indices As shown in FIG. 8B, the X-bit information to constitute the SS block index may be represented by differences between the sequence patterns for the first DMRS sequence and the second DMRS sequence, and the Y-bit information to constitute the SS block index may be represented by differences between the mapping positions of the first DMRS sequence and the second DMRS sequence.

For example, as shown in FIG. 8B, the first DMRS sequence may be generated based on the cell ID, and the second DMRS sequence may be generated based on the cell ID and the X-bit information. Also, the mapping positions (subcarrier positions) of the second DMRS sequence may be shifted from the mapping positions of the first DMRS sequence by size α based on the Y-bit information.

FIG. 8C shows an example of combining the second example and the third example, to indicate SS block indices. As shown in FIG. 8C, X-bit information to constitute the SS block index is indicated by the difference between the mapping patterns of the first DMRS sequence and the second DMRS sequence, the Y-bit information to constitute the SS block index may be indicated by the difference between the mapping positions of the first DMRS sequence and the second DMRS sequence.

For example, as shown in FIG. 8C, the mapping pattern for the second DMRS sequence may be cyclic-shifted from the mapping pattern for the second DMRS sequence by a size A, which is based on the X-bit information. Also, the mapping positions (subcarrier positions) of the second DMRS sequence may be shifted from the mapping positions of the first DMRS sequence by size α based on the Y-bit information.

In FIG. 8, the user terminal identifies SS block index from the X-bit information and the Y-bit information identified using different methods. Note that FIG. 8 is simply an example, and the combination of at least two of the first to third examples is not limited to that shown in FIG. 8.

According to the fourth example, all the bits constituting the SS block index are divided into a number of parts, and the bit value of each bit is represented using a different method per part, so that even if the number of SS block index bits increases, SS block indices can be indicated with high reliability and/or low complexity.

Fifth Example

With a fifth example of the present invention, an SS block to include three or more NR-PBCH symbols will be described.

FIG. 9 are diagrams to show examples of SS block index indication according to a fifth example of the present invention. As shown in FIGS. 9A and 9B, the SS block may be comprised of five symbols in total including three NR-PBCH symbols, one NR-PSS symbol and one NR-SSS symbol (not shown). Note that the three NR-PBCH symbols in FIGS. 9A and 9B may be contiguous, or at least two of the symbols need not be contiguous.

As shown in FIG. 9A, difference among the sequence patterns of a particular DMRS sequence (here, the third DMRS sequence) in an SS block and other DMRS sequences (here, the first and second DMRS sequences) in the SS block may represent the SS block index. In FIG. 9A, the same DMRS sequence is used for the first DMRS sequence and the second DMRS sequence.

Note that FIG. 9A shows an example of using the difference between sequence patterns of DMRS sequences, but the difference between a specific DMRS sequence and other DMRS sequences in an SS block in at least one of the sequence pattern, the mapping pattern and the mapping positions may represent the SS block index.

Alternatively, as shown in FIG. 9B, the difference between the DMRS sequence patterns of the first and second symbols for NR-PBCHs may represent first information (for example, the above-described X-bit information), and the difference between the DMRS mapping patterns of the second and third symbols may represent second information (for example, the above-described Y-bit information). In this way, when three or more symbols of NR-PBCHs are included in an SS block, different methods may be used for these symbols so as to represent different information.

Note that FIG. 9B shows an example of using the difference between DMRS sequence patterns and the difference between mapping patterns, but differences between the first and second symbols in at least one of the DMRS sequence pattern, the mapping pattern and the mapping positions may represent X-bit information. Similarly, the difference between the second and third symbols in at least one of the DMRS sequence pattern, the mapping pattern and the mapping positions may represent Y-bit information.

According to the fifth example, when three or more NR-PBCH symbols are included in an SS block, SS block indices can be indicated with high reliability and/or low complexity.

Other Examples

As described above, although the first to fifth examples have illustrated example cases in which at least part of an SS block index is represented based on differences among a number of symbols for NR-PBCHs in an SS block, in at least one of the sequence pattern, the mapping pattern and the mapping positions (sequence pattern/mapping pattern/mapping positions) of DMRSs, this is by no means limiting.

For example, the same DMRS sequence pattern, the same mapping pattern and the same mapping positions may be applied to all the NR-PBCH symbols in an SS block. In this case, at least one of the same sequence pattern, the same mapping pattern and the same mapping positions may represent at least part of the SS block indices.

Also, the sequence pattern/mapping pattern/mapping positions of part of the symbols for NR-PBCHs in an SS block may represent at least part of the SS block index.

Also, the sequence patterns/mapping patterns/mapping positions for a number of symbols for NR-PBCHs in an SS block may represent different pieces of bit information (for example, different parts of an SS block index).

FIG. 10 are diagrams to show examples of SS block index indication according to other examples. Note that FIGS. 10A and 10B assume that X-bit information and Y-bit information are included in all bits of an SS block index. Furthermore, in FIG. 10C, it is assumed that all bits of the SS block index include X, Y and Z bits.

As shown in FIG. 10A, different sequence patterns may represent different pieces of bit information among DMRSs in a number of symbols for NR-PBCHs. For example, in FIG. 10A, the sequence pattern for the first DMRS sequence may represent X-bit information, and the sequence pattern for the second DMRS sequence may represent Y-bit information.

As mentioned earlier, the sum of X bits+Y bits may be two, three or six bits in total, depending on the frequency range, and one or more candidate SS block indices are determined in advance per frequency range. In FIG. 10A, the user terminal specifies X-bit information by blind-decoding the first DMRS sequence using each candidate value for the X-bit information. Also, the user terminal specifies Y-bit information by blind-decoding the second DMRS sequence using each candidate value for the Y-bit information.

Alternatively, as shown in FIG. 10B, different pieces of bit information may be represented by using different reporting methods between DMRSs in multiple symbols for NR-PBCHs. For example, in FIG. 10B, the sequence pattern for the first DMRS sequence may represent X-bit information. Also, the mapping pattern and/or the mapping positions of the second DMRS sequence may represent Y-bit information. For example, in FIG. 10B, cyclic shift size based on Y-bit information is applied to the second DMRS sequence, and the mapping pattern represents Y-bit information.

Note that, the second DMRS sequence in FIG. 10B may be generated based on Y-bit information, may be generated based on X-bit information, or may be generated without relying on Y bit information or X bit information. Also, FIG. 10 shows sequence patterns and mapping patterns (cyclic shift patterns) to illustrate combinations of methods of indicating SS block indices, but at least two of the sequence pattern, the mapping pattern and the mapping positions may be combined.

Also, as shown in FIG. 10C, when an SS block index is constituted by X+Y+Z bits in all, the sequence pattern for the first DMRS sequence may represent X-bit information, and the sequence pattern for the second DMRS sequence may represent Y-bit information. Also, the mapping pattern and/or the mapping position of the first DMRS sequence and/or the second DMRS sequence may indicate bit values of Z bits (Z-bit information).

(Radio Communication System)

Now, the structure of a radio communication system according to the present embodiment will be described below. In this radio communication system, communication is performed using one or a combination of the herein-contained embodiments of the present invention.

Figure 11:
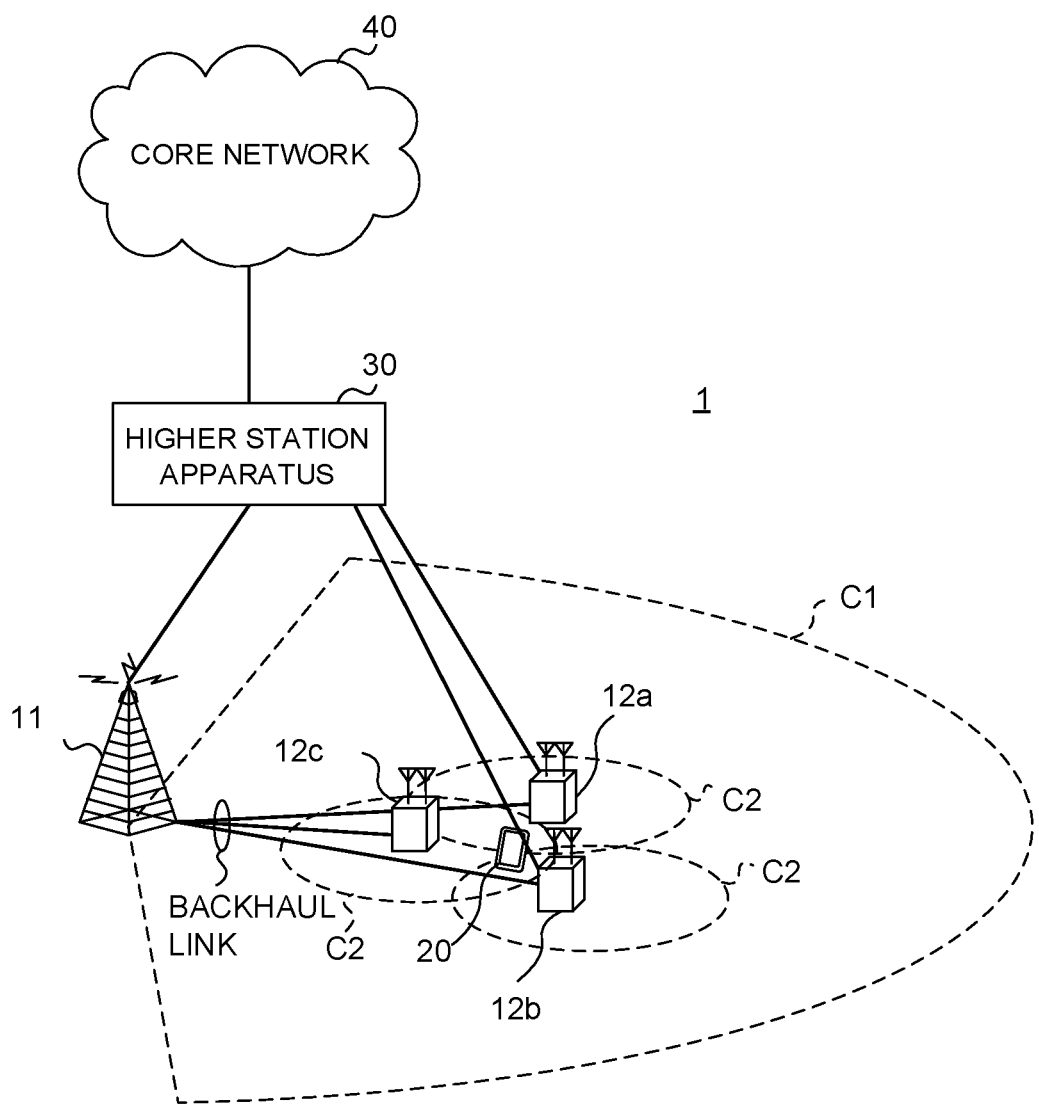
FIG. 11 is a diagram to show an exemplary schematic structure of a radio communication system according to the present embodiment.

FIG. 11 is a diagram to show an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th Generation mobile communication system)," "5G (5th Generation mobile communication system)," "FRA (Future Radio Access)," "New-RAT (Radio Access Technology)," "NR," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12 The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs). For example, in DC, the MeNB (MCG) communicates by using LTE cells, and SeNBs (SCGs) communicate by using NR/5G cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like) Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, OFDMA (Orthogonal Frequency Division Multiple Access) is applied to the downlink and SC-FDMA (Single-Carrier Frequency Division Multiple Access) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel), NR-PBCH, etc.), a downlink L1/L2 control channel and so on are used as downlink channels.

At least one of user data, higher layer control information, SIBs (System Information Blocks) and so on is communicated in the PDSCH. Also, the MIB (Master Information Block) is communicated in the PBCH. A shared control channel that reports the presence or absence of a paging channel is mapped to a downlink L1/L2 control channel (for example, PDCCH), and the paging channel (PCH) data is mapped to the PDSCH. Downlink reference signals, uplink reference signals and physical downlink synchronization signals are allocated separately.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," and so forth) in response to the PUSCH is communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data and/or higher layer control information are communicated by the PUSCH. Also, downlink radio quality information (CQI (Channel Quality Indicator)), delivery acknowledgment information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 12:
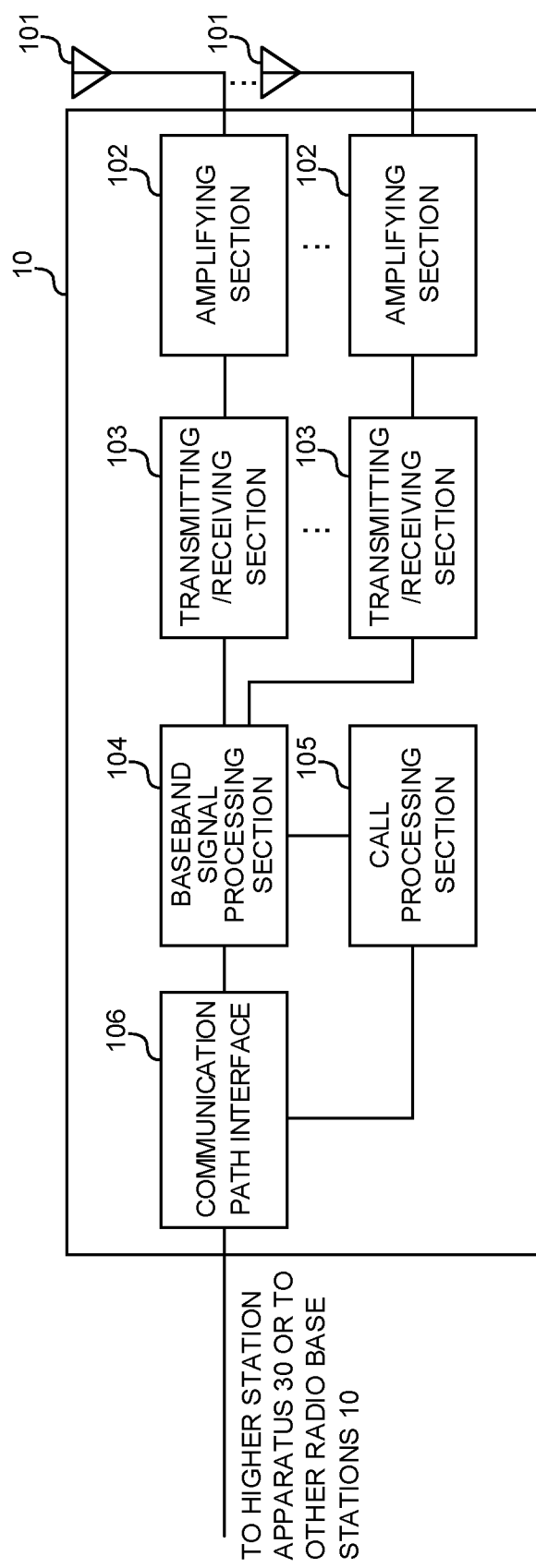
FIG. 12 is a diagram to show an exemplary overall structure of a radio base station according to the present embodiment.

FIG. 12 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 at least performs call processing such as setting up and releasing communication channels, manages the state of the radio base station 10 or manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit a synchronization signal (SS) block, which contains a plurality of synchronization signals and a plurality of broadcast channels that are allocated to different time fields. Also, the transmitting/receiving sections 103 transmit demodulation reference signal (DMRSs), which are allocated to the same time fields with broadcast channels.

Figure 13:
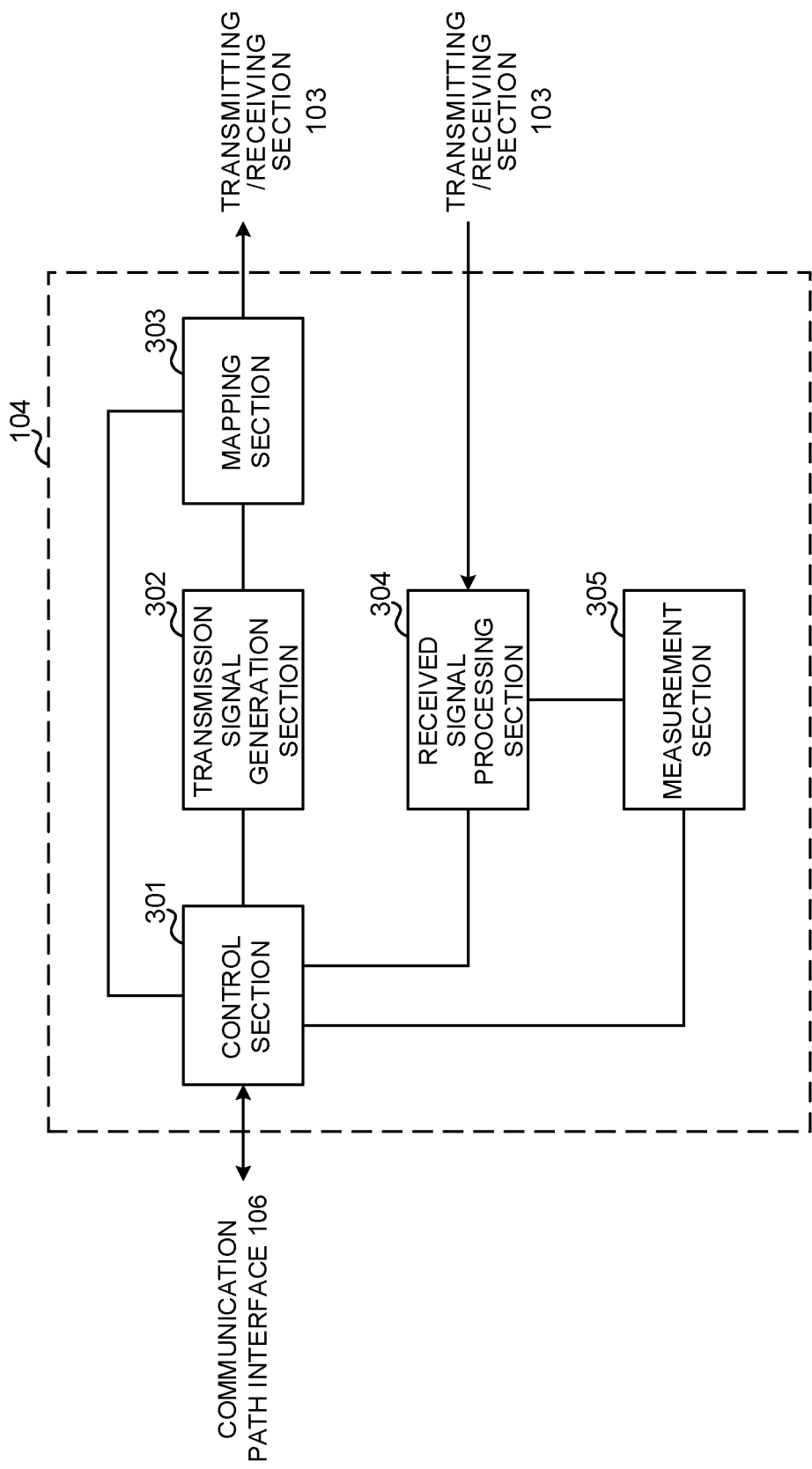
FIG. 13 is a diagram to show an exemplary functional structure of a radio base station according to the present embodiment.

FIG. 13 is a diagram to show an exemplary functional structure of a radio base station according to the present embodiment. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104. The baseband signal processing section 104 has digital beamforming functions for providing digital beamforming.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, at least one of the generation of signals in the transmission signal generation section 302 (including signals that correspond to synchronization signals, the MIB, paging channels, broadcast channels and so on), the allocation of signals in the mapping section 303, and so on.

The control section 301 controls the generation and transmission of SS blocks, which include synchronization signals and broadcast channels (NR-PBCH). The control section 301 also controls the generation and/or mapping of DMRS sequences to be multiplexed over NR-PBCH symbols.

To be more specific, the control section 301 may control the generation of DMRS sequences that are allocated to at least part of a number of symbols for NR-PBCHs. For example, the control section 301 may control the generation of DMRS sequences corresponding to part of these symbols based at least on part of the information that identifies the SS block (also referred to as "SS block identification information," including, for example, SS block index and/or SS burst index) (first example). Furthermore, the control section 301 may control the generation of the DMRS sequence for each symbol based on identification information (cell ID) of the cell in which the SS block is transmitted (first example).

The control section 301 may also control the mapping pattern (for example, cyclic shift) of DMRSs that are allocated to at least part of the multiple symbols for NR-PBCHs. For example, the control section 301 may control the cyclic shift of DMRS sequences in part of the multiple symbols based at least on part of the SS block identification information (second example).

Also, the control section 301 may control the frequency positions (mapping positions) where DMRS sequences are mapped, at least in part of the multiple symbols for NR-PBCHs. For example, the control section 301 may shift the mapping positions in part of these multiple symbols based at least on part of the SS block identification information (third example).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and the signals after the receiving processes to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), the SINR (Signal to Interference plus Noise Ratio), channel states and so on of the received signals. The measurement results may be output to the control section 301.

(User Terminal)

Figure 14:
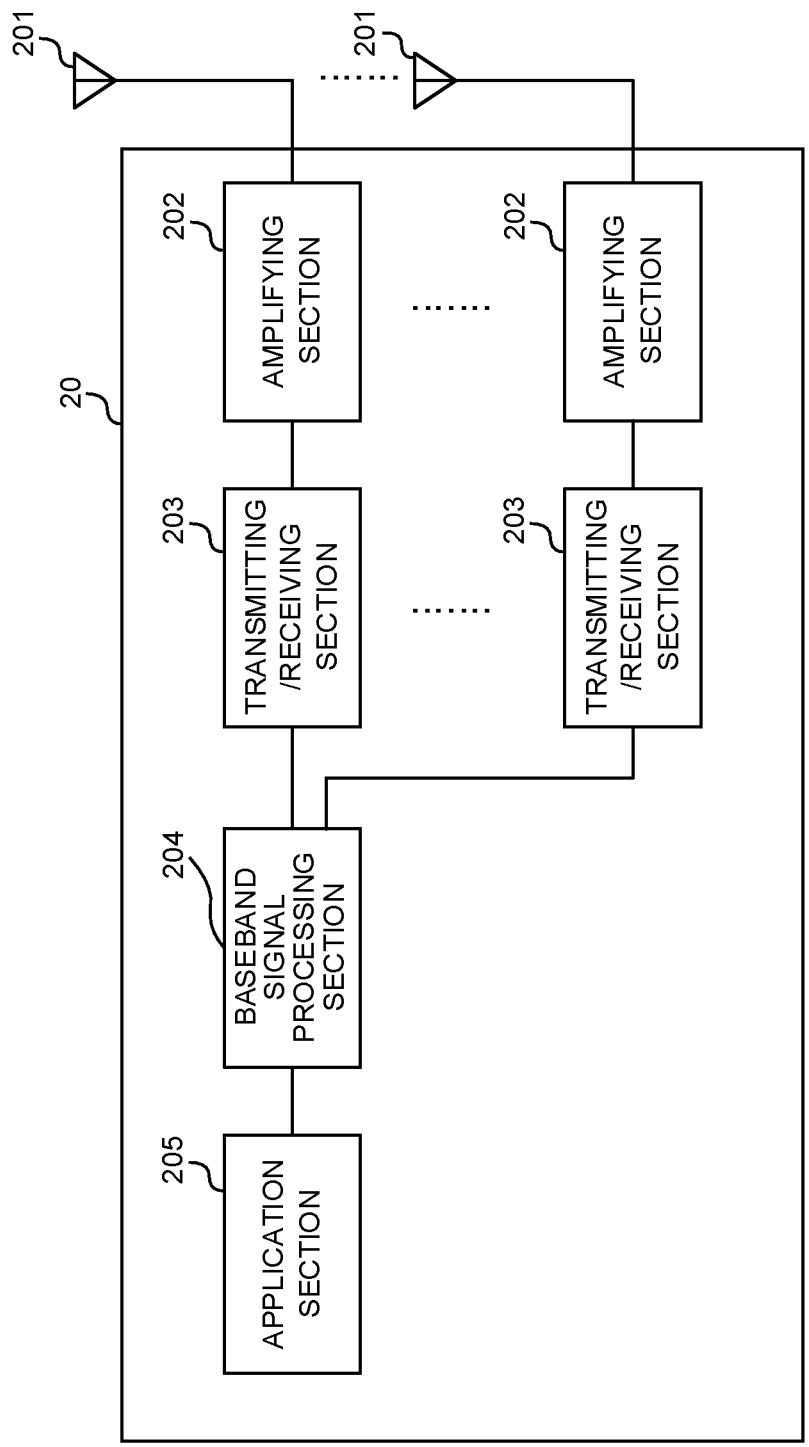
FIG. 14 is a diagram to show an exemplary overall structure of a user terminal according to the present embodiment.

FIG. 14 is a diagram to show an exemplary overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, at least one of an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains Furthermore, the transmitting/receiving antennas 201 may be constituted by, for example, array antennas.

The transmitting/receiving sections 203 receive a synchronization signal block, which contains synchronization signals and broadcast channels. Also, the transmitting/receiving sections 203 receive demodulation reference signals (DMRSs), which are allocated to the same time fields with broadcast channels.

Figure 15:
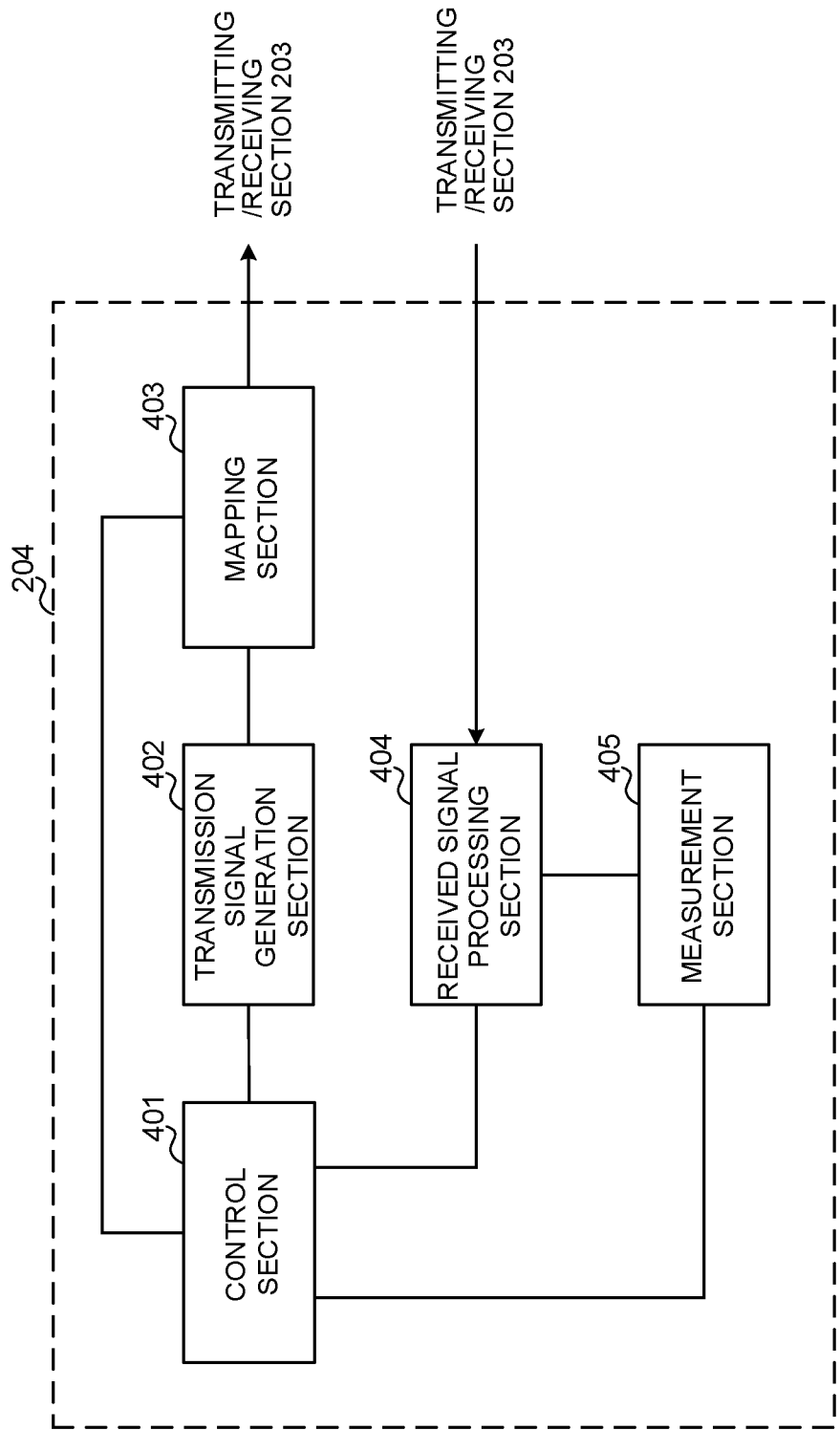
FIG. 15 is a diagram to show an exemplary functional structure of a user terminal according to the present embodiment.

FIG. 15 is a diagram to show an exemplary functional structure of a user terminal according to the present embodiment. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 exerts control so that the synchronization signal block is received in or above a predetermined frequency band. In addition, the control section 401 exerts control so that the synchronization signal block is received on the assumption that the synchronization signal block is allocated to a predetermined field in a slot.

The control section 401 exerts control so that SS block identification information is specified (or acquired) based on DMRSs that are multiplexed over a number of symbols for broadcast channels (NR-PBCHs) in the SS block. To be more specific, the control section 401 may specify SS block identification information based on differences among the multiple symbols, in at least one of DMRS sequences for NR-PBCHs, the mapping patterns of DMRS sequences, and the frequency positions for mapping DMRS sequences (see the first to fifth example, and FIG. 5 to FIGS. 9).

The control section 401 may also specify at least part of the SS block identification information from at least one of the DMRS sequences, the mapping patterns and the frequency positions of different symbols for NR-PBCHs (see other examples and FIG. 10).

Also, the control section 401 may derive a time index based on the SS block identification information that is specified.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information and/or channel state information (CSI) based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 receives synchronization signals and broadcast channels, which the radio base station transmits by applying beamforming, based on commands from the control section 401. In particular, the received signal processing section 404 receives the synchronization signal and the broadcast channel that are allocated to at least one of a number of time fields (for example, symbols) that constitute a predetermined transmission time interval (for example, a subframe or a slot).

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, signals after the receiving processes and so on, to the measurement section 405.

The measurement section 405 conducts measurements with respect to the received signals. For example, the measurement section 405 conducts measurements using beamforming RSs transmitted from the radio base station 10.

The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR, etc), downlink channel information (for example, CSI) and so on of the received signals. The measurement results may be output to the control section 401. For example, the measurement section 405 performs RRM measurements using synchronization signals.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 16:
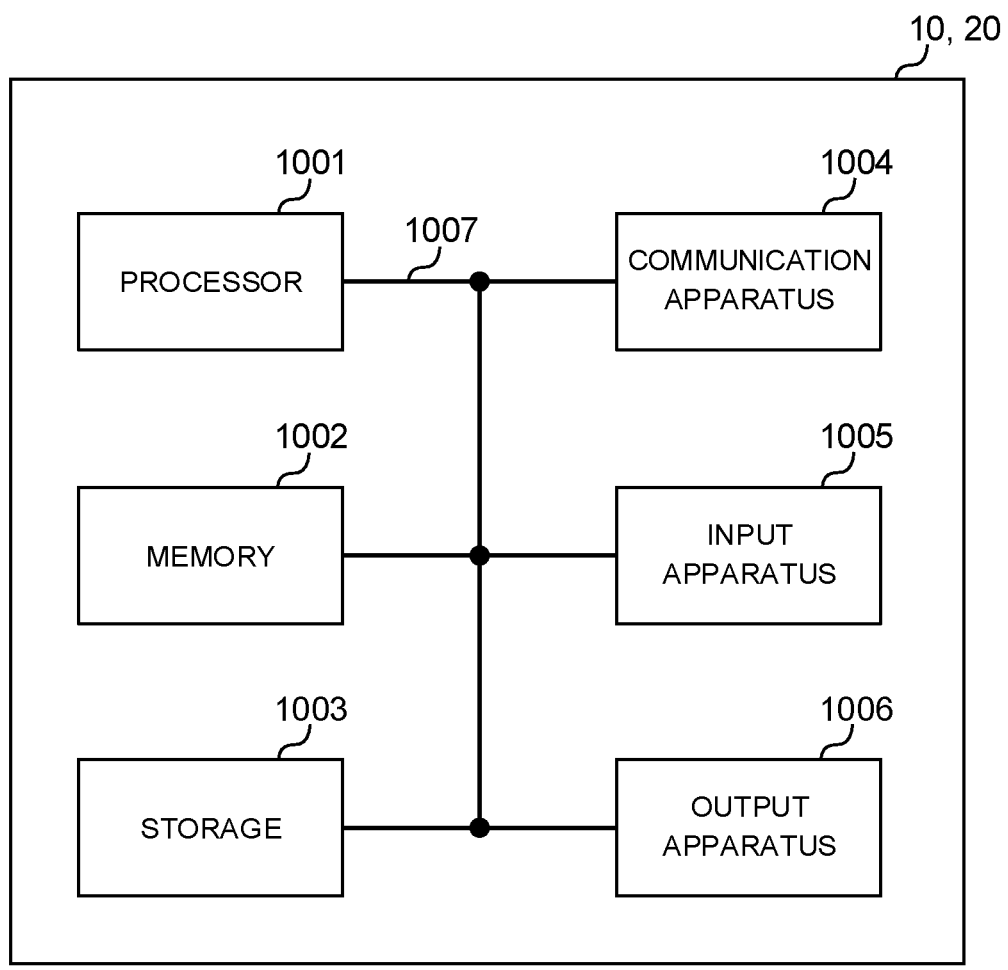
FIG. 16 is a diagram to show an exemplary hardware structure of a radio base station and a user terminal according to the present embodiment.

For example, the radio base station, user terminals and so on according to the present embodiment mode may function as a computer that executes the processes of the radio communication method of the present invention. FIG. 16 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD).

For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Also, each device shown in FIG. 16 is connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

A slot may be formed with one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be formed with one or more symbols in the time domain.

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of contiguous subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms.

Here, a TTI refers to the minimum time unit of scheduling in radio communication, for example. For example, in LTE systems, a radio base station schedules the radio resources (such as the frequency bandwidth and/or transmission power that can be used in each user terminal) to allocate to each user terminal in TTI units. Note that the definition of TTIs is not limited to this. The TTI may be the transmission time unit of channel-encoded data packets (transport blocks), code blocks and/or codewords, or may be the unit of processing in scheduling, link adaptation and so on. Note that, when 1 slot or 1 minislot is referred to as a "TTI," one or more TTIs (that is, one or multiple slots or one or more mini slots) may be the minimum time unit of scheduling. Also, the number of slots (the number of minislots) to constitute this minimum time unit of scheduling may be controlled.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," and so on.

A resource block (RB) is the unit of resource allocation in the time domain and the frequency domain, and may include one or a plurality of contiguous subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are simply examples. For example, configurations pertaining to the number of subframes included in a radio frame, the number of slots included in a subframe or a radio frame, the number of mini-slots included in a slot, the number of symbols included in a slot or a mini-slot, the number of subcarriers included in an RB, the number of symbols in a TTI, the duration of symbols, the duration of cyclic prefixes (CPs) and so on can be changed in a variety of ways.

Also, the information and parameters described in this specification may be represented in absolute values or in relative values with respect to predetermined values, or may be represented in other equivalent information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information or by reporting other pieces of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, "uplink" and/or "downlink" may be interpreted as "sides." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802 16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   receiver that receives one or more synchronization signal (SS) blocks, which include a synchronization signal and a broadcast channel; and
   a processor that specifies identification information of the SS blocks, based on at least one of a difference of demodulation reference signal sequences for the broadcast channel, a difference of mapping pattern of the reference signal sequences, and a difference of frequency position to which the reference signal sequences are mapped, among a plurality of symbols in the SS blocks, wherein
   when a maximum number of the SS blocks varies per frequency range, the identification information of the SS blocks is indicated to the terminal using a way that is suitable for each frequency range.

2. The terminal according to claim 1, wherein the reference signal sequences in part of the plurality of symbols are generated based on at least part of the identification information of the SS blocks.

3. The terminal according to claim 2, wherein the reference signal sequences in each of the plurality of symbols are generated based on identification information of a cell in which the SS blocks is transmitted.

4. The terminal according to claim 2, wherein the mapping pattern in part of the plurality of symbols is cyclic-shifted based on at least part of the identification information of the SS blocks.

5. The terminal according to claim 2, wherein the frequency position in part of the plurality of symbols is shifted based on at least part of the identification information of the SS blocks.

6. The terminal according to claim 1, wherein the reference signal sequences in each of the plurality of symbols are generated based on identification information of a cell in which the SS blocks is transmitted.

7. The terminal according to claim 6, wherein the mapping pattern in part of the plurality of symbols is cyclic-shifted based on at least part of the identification information of the SS blocks.

8. The terminal according to claim 6, wherein the frequency position in part of the plurality of symbols is shifted based on at least part of the identification information of the SS blocks.

9. The terminal according to claim 1, wherein the mapping pattern in part of the plurality of symbols is cyclic-shifted based on at least part of the identification information of the SS blocks.

10. The terminal according to claim 9, wherein the frequency position in part of the plurality of symbols is shifted based on at least part of the identification information of the SS blocks.

11. The terminal according to claim 1, wherein the frequency position in part of the plurality of symbols is shifted based on at least part of the identification information of the SS blocks.

12. A radio communication method comprising, in a terminal, the steps of:
    receiving one or more synchronization signal (SS) blocks, which include a synchronization signal and a broadcast channel; and
    specifying identification information of the SS blocks, based on at least one of a difference of demodulation reference signal sequences for the broadcast channel, a difference of mapping pattern of the reference signal sequences, and a difference of frequency position to which the reference signal sequences are mapped, among a plurality of symbols in the SS blocks, wherein
    when a maximum number of the SS blocks varies per frequency range, the identification information of the SS blocks is indicated to the terminal using a way that is suitable for each frequency range.

* * * * *